United States Patent
Stein

[15] 3,654,681
[45] Apr. 11, 1972

[54] CUTOFF TOOL HAVING IMPROVED CHIP RELIEVING SURFACE

[72] Inventor: William B. Stein, Barberton, Ohio

[73] Assignee: The Warner & Swasey Company, Cleveland, Ohio

[22] Filed: Apr. 22, 1970

[21] Appl. No.: 30,683

[52] U.S. Cl. ................................................29/95
[51] Int. Cl. ..............................................B26d 1/00
[58] Field of Search ..................................29/95, 96

[56] References Cited

UNITED STATES PATENTS

| 2,713,714 | 7/1955 | Krause | 29/95 |
| 3,254,392 | 6/1966 | Novkov | 29/95 |
| 3,158,921 | 12/1964 | Yost | 29/96 |
| 3,564,684 | 2/1971 | Wietrzykowski | 29/95 |

Primary Examiner—Harrison L. Hinson
Attorney—Freeman & Taylor

[57] ABSTRACT

A metal cutoff tool characterized by the fact that the cutting portion thereof is provided with a chip breaker surface that includes opposed chamfered surfaces located rearwardly of the cutting edge and that assist in providing clearance for chip removal purposes.

5 Claims, 5 Drawing Figures

PATENTED APR 11 1972

3,654,681

INVENTOR.
WILLIAM B. STEIN

BY Freeman & Taylor

ATTORNEYS

CUTOFF TOOL HAVING IMPROVED CHIP RELIEVING SURFACE

BACKGROUND OF THE INVENTION

This invention relates in general to the art of metal working and in particular to the field of metal cutoff.

DESCRIPTION OF THE PRIOR ART

In the art of metal cutoff, it has long been known that unusual and relatively heavy cutting forces are encountered due to the fact that the force of cutoff is provided across a transverse surface rather than having a line or point type of contact with the revolving workpiece, as is the case with other metal working tools.

In view of this, the prior art initially employed a knife or blade-like type of cutoff tool that was adapted to absorb this force while still effectuating cutoff.

A significant advance in the art of metal cutoff came with the advent of Novkov, U.S. Pat. No. 2,964,833, which taught replacement of the knife-like construction of the prior art with a two-piece cutoff unit that included a support blade and a consummable insert unit of thin, elongate pencil-like configuration that was supported thereon.

While cutoff tools, such as that shown in the aforementioned Novkov patent, have achieved long-standing commercial success, there nonetheless remain difficulties that are caused principally by the need for providing appropriate back and side clearance angles that serve to prevent sticking or binding of the tool with the side walls of the groove that are established as the depth of cut increases.

The clearance angles just referred to are imperative to insure proper cutoff, and accordingly the effectiveness of the tool is directly proportionate to the effectiveness of side and back clearance during cutoff.

In the prior art, it has also long been known that if the area immediately behind the cutting edge is relieved, that improved results will occur because of the fact that this relieved area also serves as a chip breaker with the chip being directed through a path that tends to automatically curl the same so as to facilitate its emission from the groove in short arcuately wound segments.

A typical use of a chip breaker surface of the type discussed is shown in Anthony, U.S. Pat. No. 2,416,975, in which an arcuate recess is provided behind the cutting edge to facilitate removal of chips.

While the use of a chip breaker surface of the type described results in certain advantages, the existence of such chip breaking surfaces serves to create an additional problem that has not heretofore been solved by the prior art.

Specifically, it has been found that when the cutting edge is lowered beneath the plane of the top surface of the insert, that the effective width of the cutting edge will be decreased when side clearance is ground on the tool.

As a result of this decreased width of the cutting edge, a problem is encountered in that the rearwardly presented portion of the top surface will normally be wider and thus as the cutoff operation continues, this portion will rub against the wall of the groove being made during cutoff.

The result of such construction has been unsatisfactory in the past.

SUMMARY OF THE INVENTION

It has been discovered that the advantages of utilizing an integral chip breaking surface can be employed without incurring the resultant disadvantages aforementioned, if the forwardly presented opposed edges of the top surface are chamfered so as to reduce the width of the top surface to the point where the same is compatible with the width of the cutting edge.

By this arrangement, there will still remain sufficient side clearance at all points rearwardly of the cutting edge so as to avoid any interference between the opposed walls of the tool and the opposed walls of the groove that has been cut by the advancing cutting edge of the cutting tool.

Production of the tool having the above advantages accordingly becomes the principal object of this invention with other objects thereof becoming more apparent upon reading the following brief specification, considered and interpreted in view of the accompanying drawings.

OF THE DRAWINGS

FIG. 1 is a perspective view of the improved cutting tool.

FIGS. 2, 3, and 4 are top plan, side elevation and front views respectively of the preferred embodiment of the invention.

FIG. 5 is a view similar to FIG. 4, but being enlarged to show the condition of the insert prior to the time that the chamfered areas are provided thereon.

DESCRIPTION OF THE PREFERRED EMBODIMENT

Figure 1:
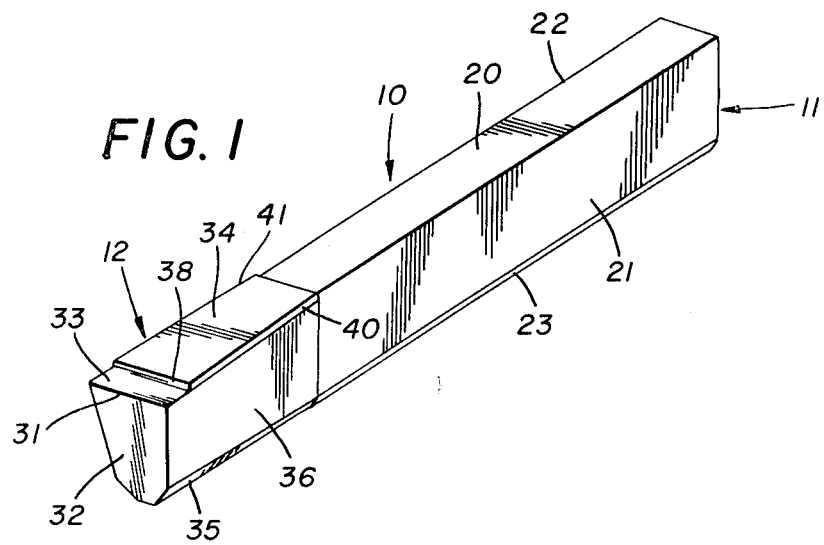
Figure 2:
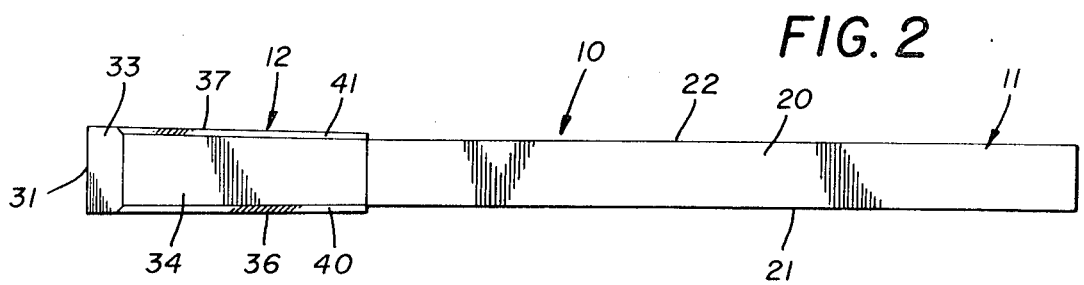

Referring now to the drawings, in FIG. 1 the improved insert, generally designated by the numeral 10, includes a shank or body portion 11 and a tip portion 12, the arrangement being such that the shank 11 and tip 12 are arranged coextensively to define an overall insert 10 of elongated pencil-like configuration. Alternatively, the shank 11 could include a forward extension that supports a reduced thickness cutting tip so as to provide a so-called "wafer-like" construction.

The shank 11 includes a top surface 20, opposed side surfaces 21 and 22, and a truncated V-shaped bottom surface 23, with the arrangement of these parts being similar to the arrangement shown in connection with the aforesaid Novkov, U.S. Pat. No. 2,964,833.

Figure 3:
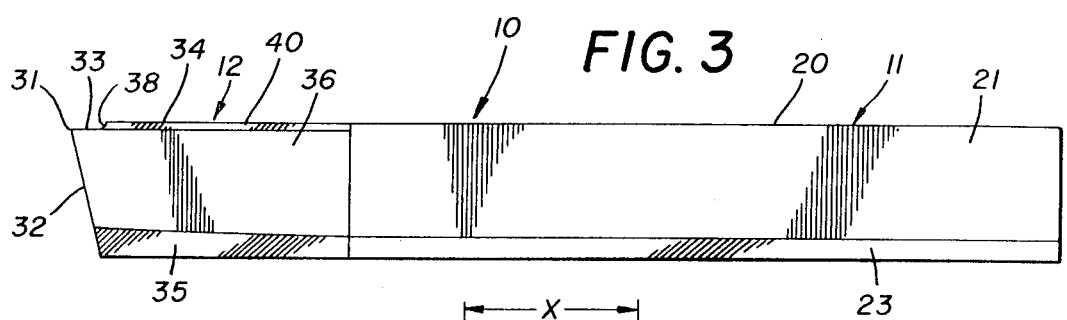

Thus, the tip 12 first includes a transversely extending cutting edge 31 that is defined by the intersection of a forward face 32, and a relieved area 33 that is undercut with respect to the top surface 34, with the surface 34 preferably being coplanar with surface 20 as best shown in FIGS. 1 and 3 of the drawings.

In addition to the aforementioned component parts, the tip 12 further includes, in the preferred embodiment shown, a V-shaped bottom surface 35 and opposed side walls 36 and 37. The side walls 36 and 37 are preferably ground so as to provide the requisite degree of side and back clearance in the manner well-known in the prior art. Also in this regard the tip 12 is fused in known fashion to the forward end of the shank 11 in the preferred form of the invention, with brazing or other known techniques being employed in this regard.

As indicated previously, the area 33 on the top of tip 12 is undercut or offset below the plane of the top surface 34 so as to define a chip breaker surface that terminates in a forwardly presented transversely extending wall 38. This wall preferably has an arcuate contour from top to bottom as shown in FIG. 3 so as to effectuate curling of the chip in known fashion.

Figures 4, 5:
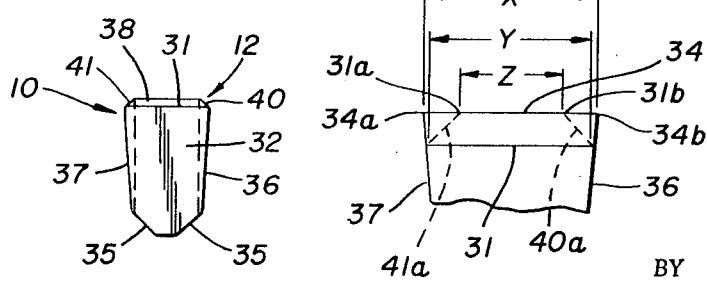

In addition to the aforementioned component parts, chamfers 40 and 41 are provided at the point of juncture between the top surface 34 and the opposed side surfaces 36 and 37, with the chamfered area best being shown in FIGS. 1 and 4 of the drawings. The effect and purpose of the chamfers 40 and 41 can best be illustrated by an examination of FIG. 5 where the full line front view shows the condition of the surfaces 36 and 37 prior to providing the chamfers 40 and 41 thereon. In this regard, it will be noted that the width of the top surface 34 at its point of juncture with wall 38 prior to chamfering would be defined by the numerals 34a and 34b which serve to define an overall width indicated by the letter X in FIG. 5. On the other hand, the width of the cutting edge 31 is indicated by the letter Y. Following chamfering, the width of surface 34 would be defined by the numerals 31a and 31b which define a width indicated by the letter Z in FIG. 5.

Since dimension X is greater than dimension Y, it follows that absent chamfering, binding or interference within the cut would occur because of the increased width defined by the dimension X.

Accordingly, chamfers along the dotted lines 40a and 41a are provided for this purpose.

Use or operation of the improved unit is apparent because as chips are severed by the cutting edge 31, they will be directed rearwardly across surface 33 and into contact with arcuate wall 38, whereupon the same will be curled, broken off and easily removed from the cut. In the meantime, the maximum effective width of the tool will be defined by dimension Y, due to the chamfers. Thus as the cutting edge progresses into the revolving workpiece, no interference between the side walls of the tool and the side walls of the groove will occur due to the relieved condition achieved by the virtue of the chamfered condition just described.

While a full and complete description of the invention has been set forth in accordance with the dictates of the Patent Statutes, it is to be understood that the invention is not intended to be limited to the specific embodiment herein shown.

Thus, for example, the tip portion of either a blade-like unit or a circular unit having a plurality of cutting tips could be provided with this feature without departing from the scope of the invention. Also, while top surface 34 of tip 12 and top surface 20 of shank 11 are shown lying in the same plane, they could also be offset from each other if desired.

Accordingly, modifications of the invention may be resorted to without departing from the spirit hereof or the scope of the appended claims.

Also, and as pointed out earlier, while the invention has been shown and described in connection with what is commonly called a "full butt brazed" insert, it is believed apparent that the principles thereof have equal utility with an insert in which the shank has a pocket on its forward end which receives a cutting tip of reduced dimensions.

I claim:

1. An improved cutting tip for use on metal cutting tools, comprising:
   A. a hardened body defining said cutting tip and including:
      1. a front surface
      2. a top surface
      3. and opposed side surfaces
      4. with the point of juncture of said front surface and said top surface defining a forwardly presented, transversely extending cutting edge portion whose width is defined by said opposed side surfaces of said hardened body;
   B. said cutting edge portion including a transverse undercut of uniform depth provided in said top surface and defining a chip relief area that extends rearwardly to a transverse wall and has a width substantially equal to the width of said cutting edge portion adjacent said cutting edge and tapers to a lesser width adjacent said wall; and
   C. opposed chamfered surfaces interconnecting said top and side surfaces and extending rearwardly from said transverse wall at the point of juncture between said top surface and said opposed side surfaces of said hardened body whereby said top surface has a lesser width than said cutting edge.

2. The device of claim 1 further characterized by the fact that said chamfered surfaces are equally chamfered throughout their lengths and are spaced equidistant from the longitudinal axis of said tool.

3. The device of claim 1 further characterized by the fact that chamfered surfaces are of equal heighth to the depth of said undercut.

4. The device of claim 1 further characterized by the fact that said transverse wall is concave.

5. An improved metal cutting tool, comprising:
   A. an elongate pencil-like insert having
      1. a shank with
         a. opposed top and bottom surfaces and
         b. opposed side walls;
      2. a cutting tip
         a. mounted on one end of said shank and having
         b. opposed side walls, opposed top and bottom surfaces and opposed front and rear walls,
         c. a transverse cutting edge defined by the point of juncture of said top surface and said front wall,
         d. said top surface being undercut adjacent said cutting edge with said undercut extending rearwardly and terminating in a transverse wall and having a width substantially equal to the width of said cutting edge portion adjacent said cutting edge and tapering to a lesser width adjacent said wall; and
         e. opposed chamfered surfaces interconnecting said top and side surfaces and extending rearwardly from said wall along the point of juncture of said top surface and said side walls through the length of said tip whereby said top surface has a lesser width than said cutting edge.

* * * * *